US011900899B2

(12) United States Patent
Adam et al.

(10) Patent No.: US 11,900,899 B2
(45) Date of Patent: Feb. 13, 2024

(54) CAPO

(71) Applicant: Dunlop Manufacturing, Inc., Benicia, CA (US)

(72) Inventors: David Adam, Benicia, CA (US); James A. Dunlop, Benicia, CA (US)

( * ) Notice: Subject to any disclaimer, the term of this patent is extended or adjusted under 35 U.S.C. 154(b) by 0 days.

(21) Appl. No.: 17/583,892

(22) Filed: Jan. 25, 2022

(65) Prior Publication Data

US 2022/0238085 A1 Jul. 28, 2022

Related U.S. Application Data

(60) Provisional application No. 63/142,414, filed on Jan. 27, 2021.

(51) Int. Cl.
*G10D 3/053* (2020.01)

(52) U.S. Cl.
CPC .................................... *G10D 3/053* (2020.02)

(58) Field of Classification Search
CPC ........... G10D 3/053; G10D 1/08; G10D 3/147
See application file for complete search history.

(56) References Cited

U.S. PATENT DOCUMENTS

2010/0154616 A1* 6/2010 Campling .............. G10D 3/053
84/318

* cited by examiner

*Primary Examiner* — Kimberly R Lockett
(74) *Attorney, Agent, or Firm* — West & Associates, APC; Stuart J. West; Charlotte Rodean-Dickert

(57) ABSTRACT

A capo device for stringed instruments, comprising: a substantially J-shaped main body having an elongate arm and a short arm, a pivot arm pivotally coupled with said short arm of said J-shaped main body, an elastomeric component pivotally and compressably coupled between a portion of said elongate arm of said J-shaped main body and a proximal end of said pivot arm and a main arm pivotally coupled with said pivot arm and said main body.

9 Claims, 7 Drawing Sheets

CAPO

CROSS-REFERENCE TO RELATED APPLICATION

This application claims the benefit of priority under 35 U.S.C. § 119 to prior-filed and co-pending Provisional Patent Application Ser. No. 63/142,414, filed Jan. 27, 2021 by David Adam, et al., the compete contents of which is hereby incorporated herein by reference.

BACKGROUND

Technical Field

The present device relates to the field of apparatus used with stringed instruments and more particularly to the field of capos.

Background

Stringed instruments allow a player to selectively press a string against a fret board, neck, fingerboard, or the like, at different points along the string in order to produce certain tones or notes upon simultaneous strumming of the string. With multiple strings available for successive or simultaneous manipulation, a player can thus produce chords and melodies within the original pitch range for a particular instrument. However, it is often desirable to adjust the pitch of the entire instrument without permanent alteration, such that a player can then manipulate the instrument's strings to temporarily produce chords and melodies within a different pitch range.

A capo device allows a player of a stringed instrument, such as a guitar, to temporarily adjust the pitch of the instrument by pressing all strings of the instrument against a fret board at a desired point along the length of the fret board and locking in place, freeing the player's hand to manipulate the strings below the capo device. However, traditional capo devices can only properly be used with one size of stringed instrument neck. An ill-fitting capo device inhibits application of proper force applied to instrument strings, resulting in undesirable sound and pitch effects. Therefore, with traditional capo devices, a musician must own a different capo device for each stringed instrument for which a capo device is desired. Moreover, traditional capo devices can be cumbersome to move from one place to another along the neck of the instrument making it difficult and time consuming to transition the capo device from one location to another.

What is needed is a capo device adapted to properly engage a variety of stringed instrument neck sizes which can be quickly and easily moved from one location on the neck of a stringed instrument to another location on a stringed instrument and/or from instrument to instrument.

SUMMARY

One general aspect disclosed herein comprises a capo device for stringed instruments. The capo device can comprise a substantially j-shaped main body having an elongate arm and a short arm; a pivot arm pivotally coupled with said short arm of said j-shaped main body; an elastomeric component pivotally and compressably coupled between a portion of said elongate arm of said j-shaped main body and a proximal end of said pivot arm; and a main arm pivotally coupled with said pivot arm and said main body; wherein when said main arm is pivoted such that said main arm is in a first configuration relative to said pivot arm, said pivot arm is at a prescribed distance from said main body; and wherein when said main arm is pivoted such that said main arm is in a second configuration relative to said pivot arm, said pivot arm is biased via said spring toward a second position where said pivot arm is closer to said main body than said prescribed distance.

Embodiments and implementations can comprise one or more of the following features: the capo device wherein said pivot arm further can comprise a pivot clamp; wherein aid main arm can be pivotally coupled with said pivot arm via a linkage, which can be configured to selectively engage with a linkage seat on said pivot arm; wherein said linkage further comprises a protrusion extending from a lateral edge, and wherein said protrusion selectively engages with said linkage seat. Further, the capo device can comprise a grip component on said main arm and/or the capo device can comprise cushioning on an inner surface of said distal elongate arm and said proximal pivot arm.

BRIEF DESCRIPTION OF THE DRAWINGS

Further details of the present device are explained with the help of the attached drawings in which.

DETAILED DESCRIPTION

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Figure 1:
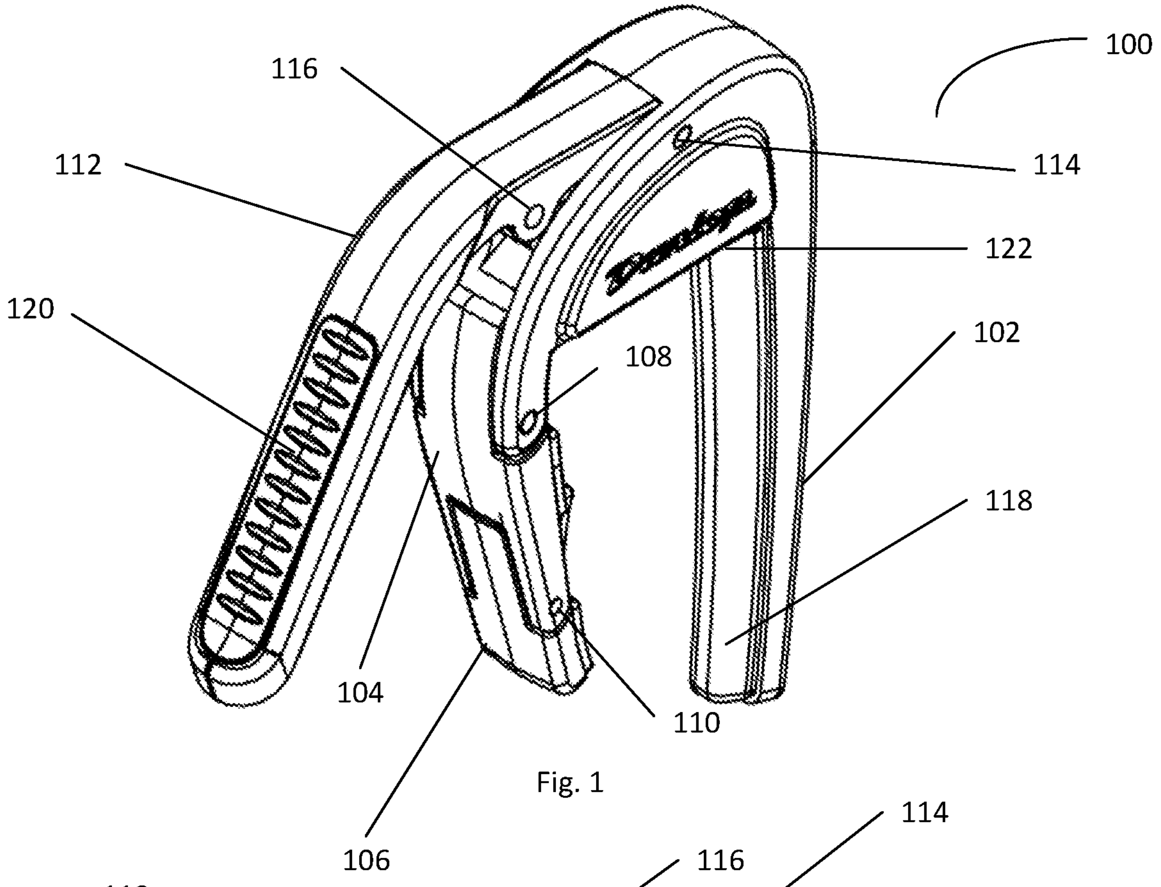
FIG. 1 depicts an isometric view of an embodiment of a capo.

FIG. 1 depicts an isometric view of an embodiment of a capo 100. In the embodiment depicted in FIG. 1, the capo 100 can comprise a main body 102 coupled with a pivot arm 104 and a pivot clamp 106. In some embodiments the main body 102 can be substantially J-shaped and have a distal elongate arm and a proximal short arm. The pivot arm 104 and the pivot clamp 106 can be coupled with a substantially J-shaped main body 102 via pins (and/or any other known and/or convenient devices allowing for pivotal connections) inserted through apertures 108 110. In the embodiment depicted in FIG. 1, the capo 100 can comprise a main arm 112 coupled with the main body 102 and pivot arm 104 and pivot clamp 106 via pins (and/or any other known and/or convenient devices allowing for pivotal connections) inserted through apertures 114 116. Additionally, in the embodiment of the capo 100 depicted in FIG. 1, the capo 100 can comprise a fret cushion 118 adapted and configured to engage the strings and fret board of a stringed instrument. Further, in the embodiment depicted in FIG. 1, the capo 100 can comprise a grip 120 and a housing 122.

In the embodiment depicted in FIG. 1, the main body 102 can comprise an elongate component and an integral curved component, and the pivot arm 104 can be pivotally coupled with the main body 102 at a first or proximal end and pivotally coupled with the pivot clamp 106 at second or distal end. Additionally, in the embodiment depicted in FIG. 1, main arm 112 can be pivotally coupled with the main body 102 and coupled with the pivot arm 104 and the pivot clamp 106, such that when a force directed toward the elongate is applied to the main arm toward the elongate component of the main body 102, the pivot arm 104 and/or the pivot clamp 106, at least one of the pivot arm 104 and the pivot clamp 106 will move away from the elongate component of the main body 102 and toward the main arm 112, thus increasing the distance between the pivot clamp 106 and the elongate portion of the main body 102. When a main arm 112 is pivoted such that a main arm 112 is in a first configuration relative to a pivot arm 104, a pivot arm 104 can be at a prescribed distance from a main body 102; and wherein when a main arm 112 is pivoted such that a main arm 112 is in a second configuration relative to a pivot arm 104, a pivot arm 104 can be biased via a spring 306 toward a second position where a pivot arm 104 can be closer to a main body 102 than said prescribed distance.

In the embodiment depicted in FIG. 1, the main body 102, the pivot arm 104, the pivot clamp 106 and the main arm 112 any or any other desired component can be comprised of material and/or materials that are rigid in nature such as metal, aluminum, steel alloys, hardened plastics and/or any other known, convenient and/or desired homogeneous or heterogeneous material(s). Additionally, in some embodiments the fret cushion 118 can be comprised of a resilient material, such as rubber or silicone and/or any other known, convenient and/or desired material that can elastically deform and engage the strings and/or the front of a fret board of a stringed instrument.

A capo device also can comprise a grip component 120 on said main arm and/or the capo device can comprise cushioning on an inner surface of said elongate arm and said pivot arm. Furthermore, in the embodiment depicted in FIG. 2, a grip component 120 can be comprised of a material adapted, configured and/or selected to have a higher coefficient of static and/or kinetic friction relative to skin on a human hand, such that a user's hand will be more likely to engage the main arm 112 instead of slip or slide relative to the main arm 112. However, in some embodiments, the grip 120 can be absent.

Figure 2:
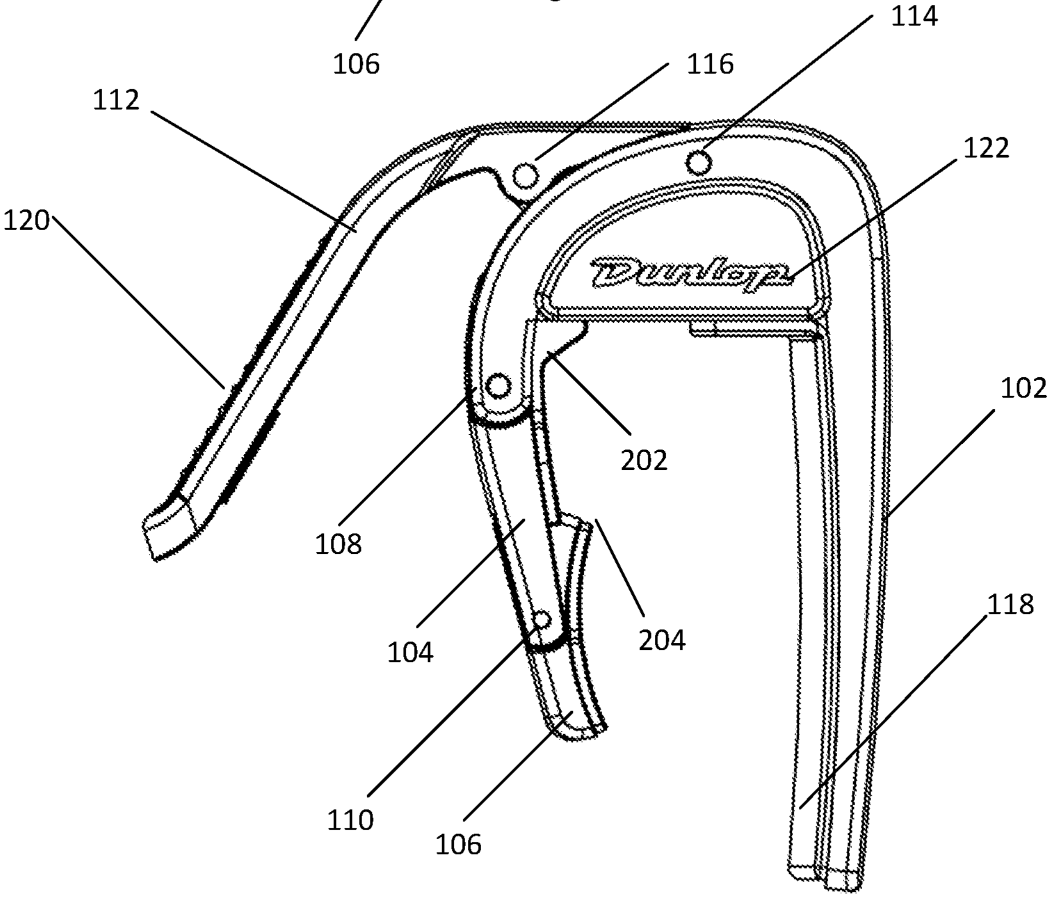
FIG. 2 depicts an elevation view of the capo depicted in FIG. 1.

FIG. 2 depicts an elevation view of the capo 100 depicted in FIG. 1. In the embodiment depicted in FIG. 2, the capo 100 comprises a pivot arm cushion 202 and pivot cushion 204. In some embodiments the pivot arm cushion 202 and/or pivot cushion 204 can be comprised of a material adapted, configured and/or selected to have a geometry and higher coefficient of static and/or kinetic friction relative to non-stringed side of a fret board, such that when the pivot arm 104 and/or pivot clamp 106 engage the rear/non-stringed side of a fret board, the capo 100 will be more likely to engage the rear side of the fret board instead of slip or slide relative to the fret board.

In some embodiments, one or more of the pivot arm cushion 202 and/or the pivot cushion 204 can be comprised of rubber and/or silicone. However, in alternate embodiments the pivot arm cushion 202 and/or the pivot cushion can be comprised of any know, convenient and/or desired homogenous or heterogeneous material(s).

Figure 3:
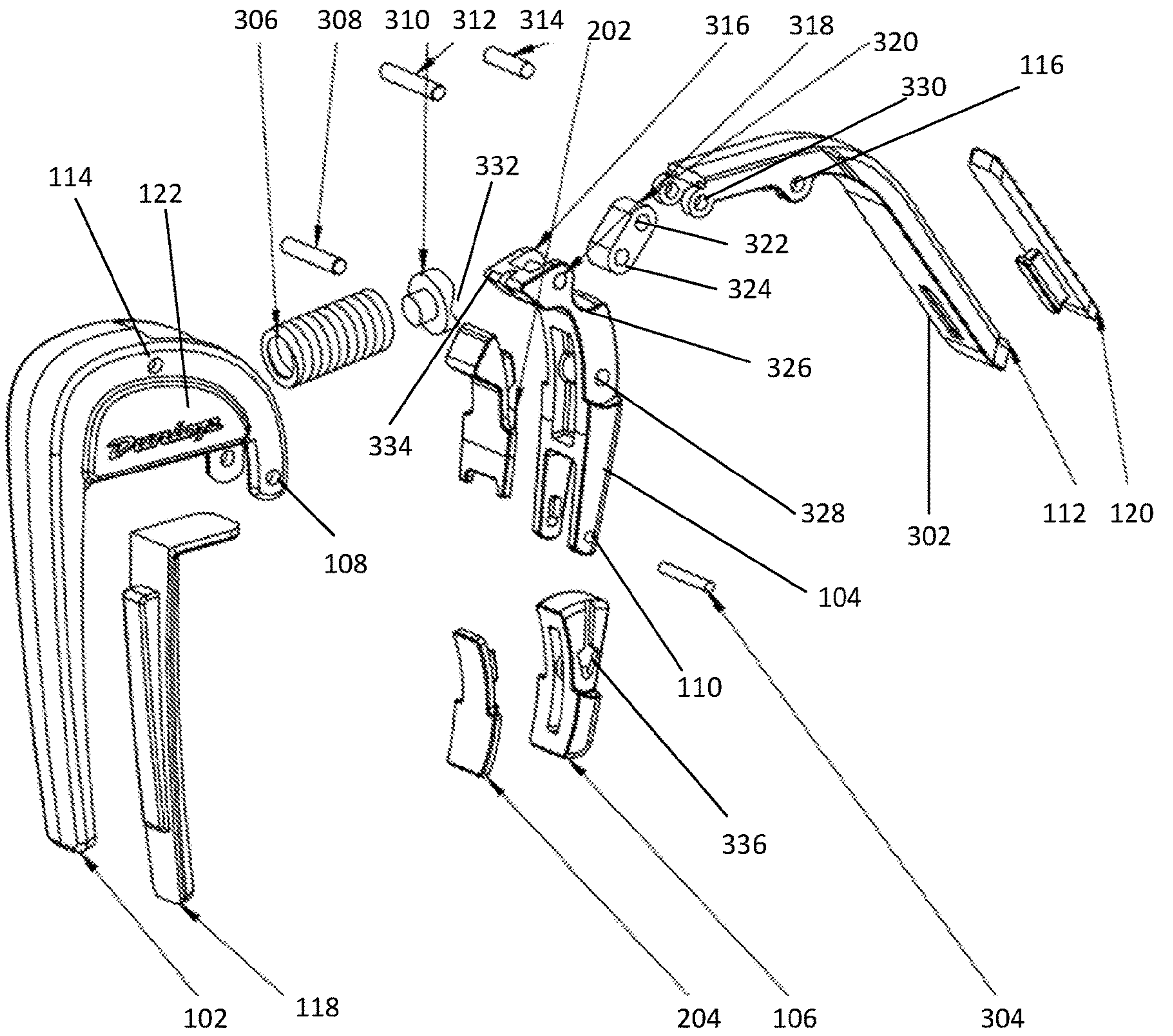
FIG. 3 depicts an exploded view of the capo depicted in FIGS. 1 and 2.

FIG. 3 depicts an exploded view of the capo depicted in FIGS. 1 and 2. In the embodiment depicted in FIG. 3, the main arm 112 can comprise an aperture 302 that is adapted and configured to selectively engage the grip 120 and/or portion of the grip 120. However, in some embodiments, one or more of the grip 120 and/or aperture 302 may be absent. In the embodiment depicted in FIG. 3, the pivot clamp 106 and pivot arm 104 can be pivotally coupled via a pin connector 304 and the apertures 110 and 336. However, in alternate embodiments, the pivot clamp 106 and the pivot arm 104 can be pivotally coupled via any known convenient and/or desired mechanism. A pivot clamp 106 can be pivotally coupled to the proximal end of a pivot arm 104 at a point substantially at the lateral center point of said pivot clamp 106 or at any other known and/or convenient location.

Figure 4:
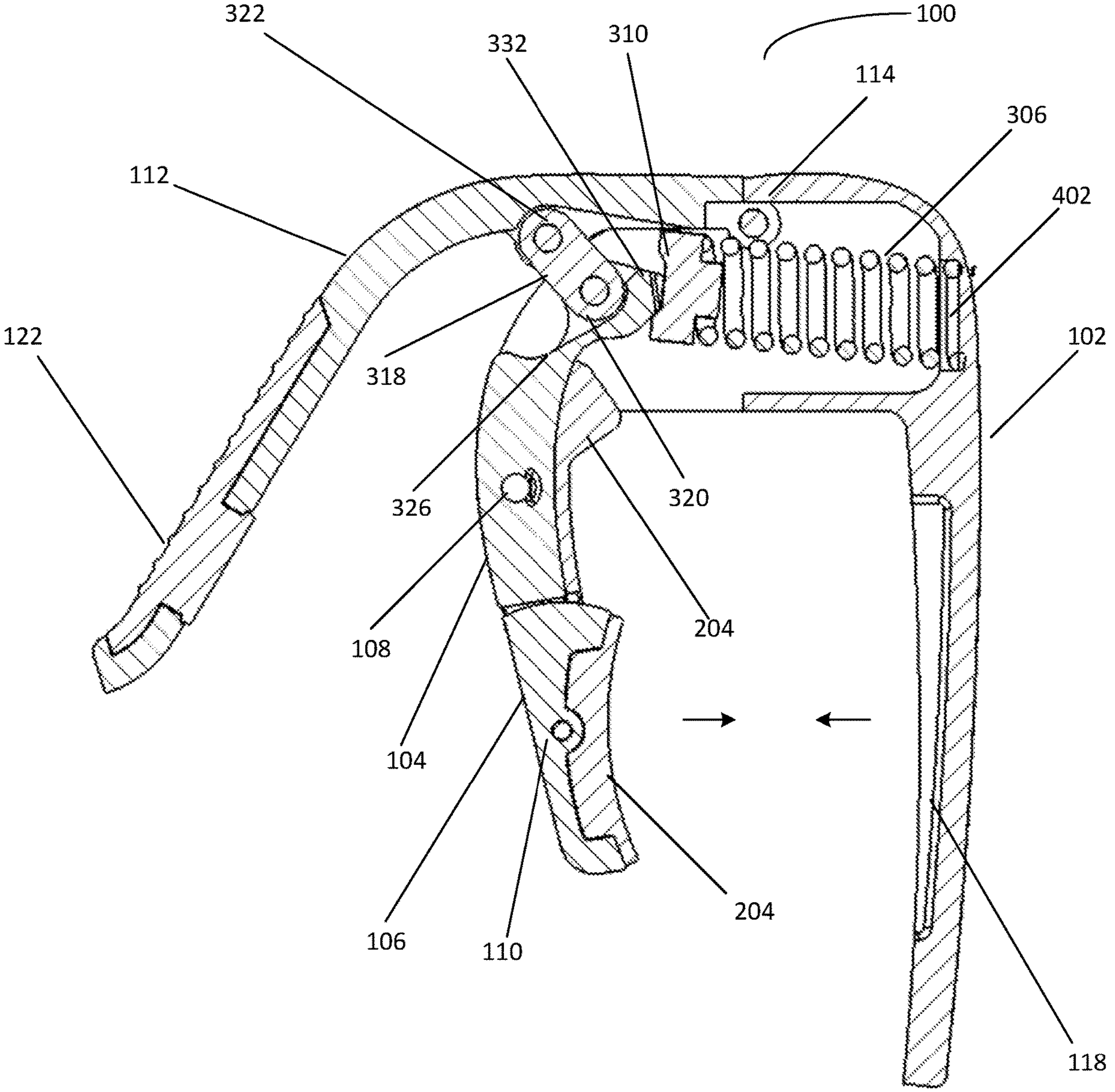
FIG. 4 depicts a cross-sectional view of capo depicted in FIGS. 1-3 in a first configuration.
Figure 5:
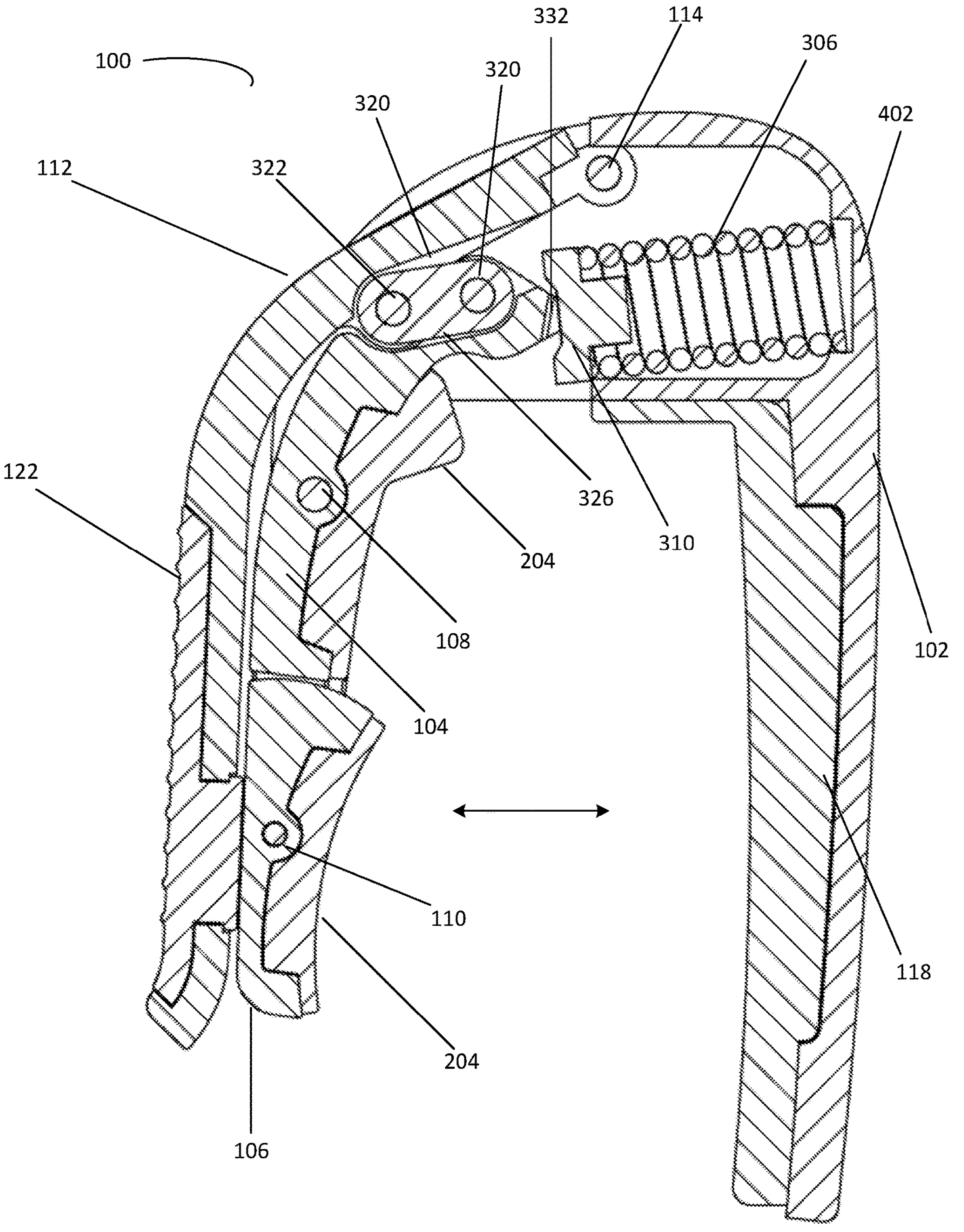
FIG. 5 depicts a cross-sectional view of capo depicted in FIGS. 1-3 in a second configuration.

In the embodiment depicted in FIGS. 3-5, a spring 306 (or any other known convenient and/or desired elastomeric component) can be coupled with the housing 122 associated with the main body 102 and coupled with a spring guide 310. Pin connector 308 can pivotally couple main body 102 and pivot arm 104 via apertures 108 and 328. Pin connector 312 can couple pivot arm 104 and linkage 320 through apertures 318 and 324. The opposing end of the linkage 320 can also be coupled with the main arm 112 via pin 314 through apertures 116 and 322.

The distal end of the linkage 324 can rest within the linkage seat 326 and when the main arm 112 is depressed the linkage 324 can rest within the linkage guide 316 within the pivot arm 104.

The spring 306 can further comprise a spring guide 310 having a notch 332 which can selectively and pivotally engage with a notch engagement portion 334 of the pivot arm 104. That is, the main arm 112 can be coupled with the pivot arm 104 via a linkage 320 which can have a rounded rectangular geometry. The linkage 320 can be pivotally coupled with the pivot arm 104 via the linkage seat 326. The linkage 320 can also be pivotally coupled with the main arm 112 via a pin 314 through the apertures 322 and 116. The linkage 320 can pivot relative to the main body 102, pivot arm 104 and main arm 112 and is adapted and configured such that in one configuration the linkage 320 can rest between the pivot arm 104 and the main arm 112 in the linkage seat 326 of the pivot arm 104 and can be controlled by the linkage guide 316 which are part of the pivot arm 104.

In operation, in a first configuration when the main arm 112 is depressed and adjacent or substantially adjacent to the pivot arm 104 (when the spring is in a biased or compressed state), the linkage 320 can pivot and the spring 306 can actuate and pivot the pivot arm 104 relative to the notch engagement portion 334 of the pivot arm 104 thus rotating the pivot arm 104 away from the main body 102. In a second configuration when the main arm 112 is rotated away from the pivot arm 104 (when the spring 306 is in the unbiased, natural or uncompressed state), the pivot arm 104 via the spring 306, spring guide 310 with linkage 320 can pivotally translate via the linkage 320 such that the pivot arm 104 is closer in proximity to the main body 102 than in the first configuration.

FIG. 4 depicts a cross-sectional view of the capo depicted in FIGS. 1-3 in a first configuration. In the embodiment and configuration of FIG. 4, the spring 306 is in a natural or unbiased state and the main arm 112 is substantially pivoted away and distal from the pivot arm 104. In such state the linkage 320 remains within the linkage guide 316 but does not rest within the linkage seat 326. In such state, the pivot arm 104 is rotated toward and biased toward the main body. FIGS. 4 and 5 also show the spring seat 402 adapted and configured to retain the spring 306 relative to the main body 102.

FIG. 5 depicts a cross-sectional view of capo depicted in FIGS. 1-3 in a second configuration. In the embodiment and configuration of FIG. 5, the spring 306 is in a compressed or biased state and the main arm 112 is substantially adjacent to the pivot arm 104. In such state the linkage 320 remains within the linkage guide 316 and is rotated relative to the main body 102, pivot arm 104, and the main arm 112, and rests within the linkage seat 326. In such state, the pivot arm 104 is rotated away from the main body relative to the first configuration.

Figure 6:
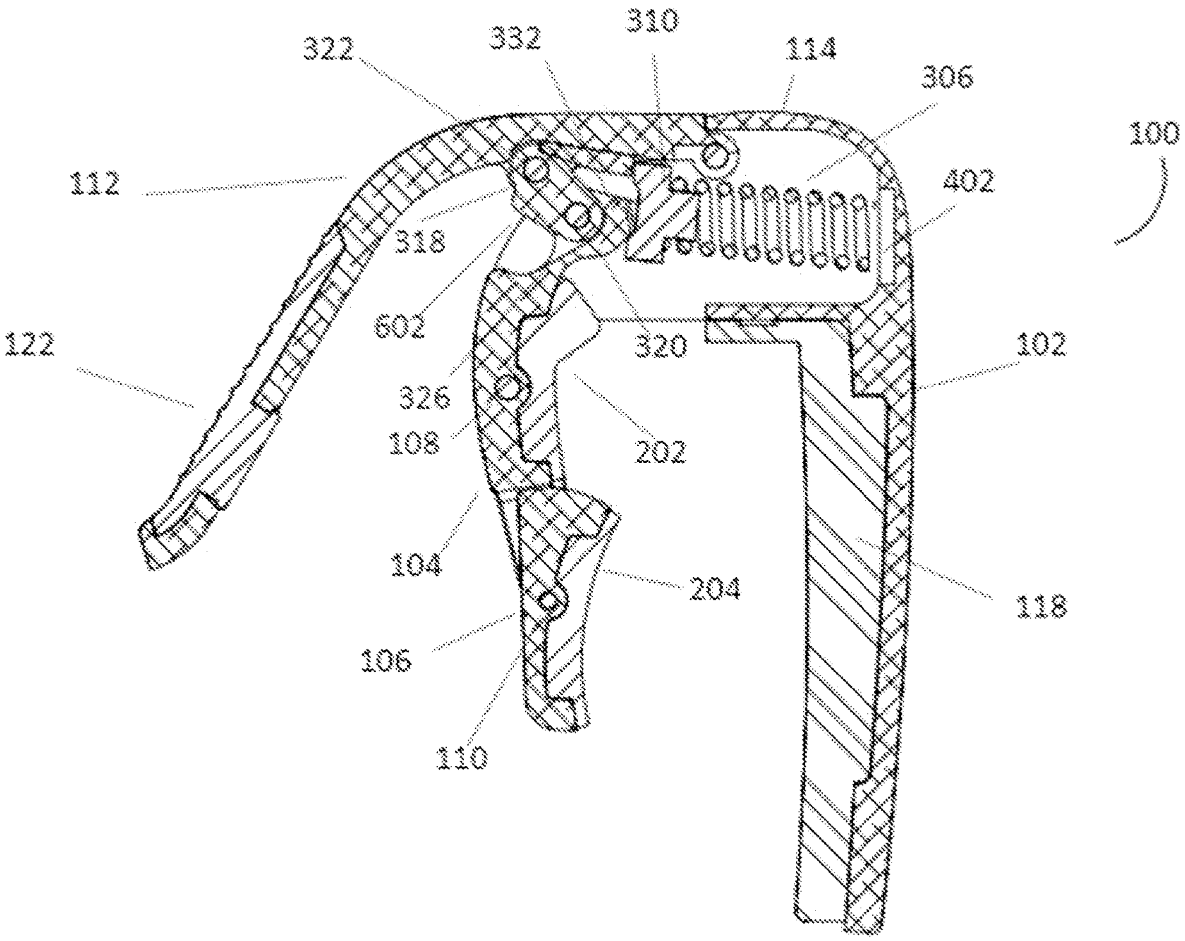
FIG. 6 depicts a cross-sectional view of another embodiment of the capo depicted in FIGS. 1-3 in a first configuration.

FIG. 6 depicts a cross-sectional view of another embodiment of the capo depicted in FIGS. 1-3 in a first configuration. In such embodiments, a linkage 320 can further comprise a protrusion 602 than can extend from a lateral edge of a linkage 320. A protrusion 602 can selectively engage with a with a linkage seat 326. As shown in FIG. 6, a protrusion 602 can have a substantially rounded triangular geometry, but in other embodiments can have any other known and/or convenient geometry. In such state a protrusion 602 does not rest within the linkage seat 326.

Figure 7:
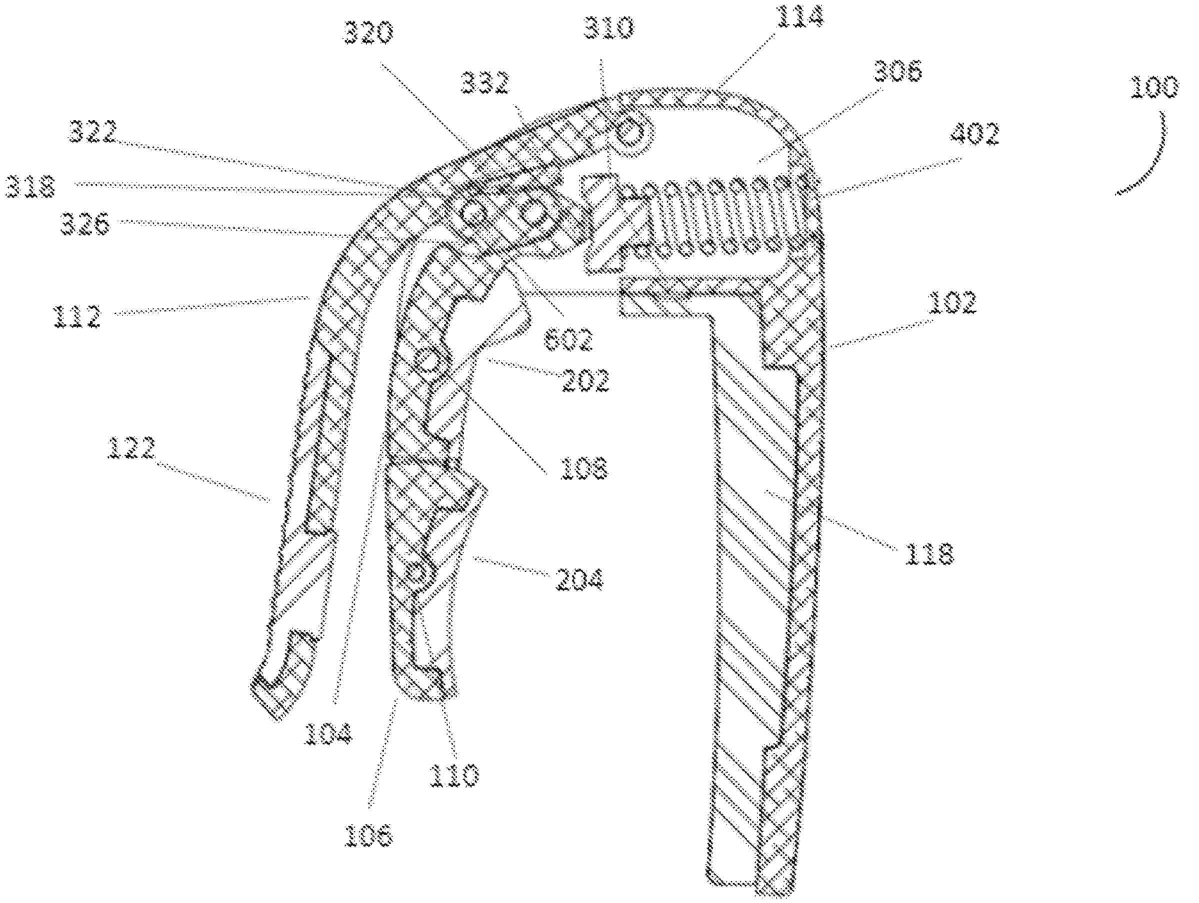
FIG. 7 depicts a cross-sectional view of another embodiment of a capo depicted in FIGS. 1-3 in a second configuration.

FIG. 7 depicts a cross-sectional view of another embodiment of a capo depicted in FIGS. 1-3 in a second configuration. In the embodiment shown in FIG. 7, the linkage 320 remains within the linkage guide 316 and is rotated relative to the main body 102, pivot arm 104 and the main arm 112, but a protrusion 602 rests within the linkage seat 326.

Figure 8:
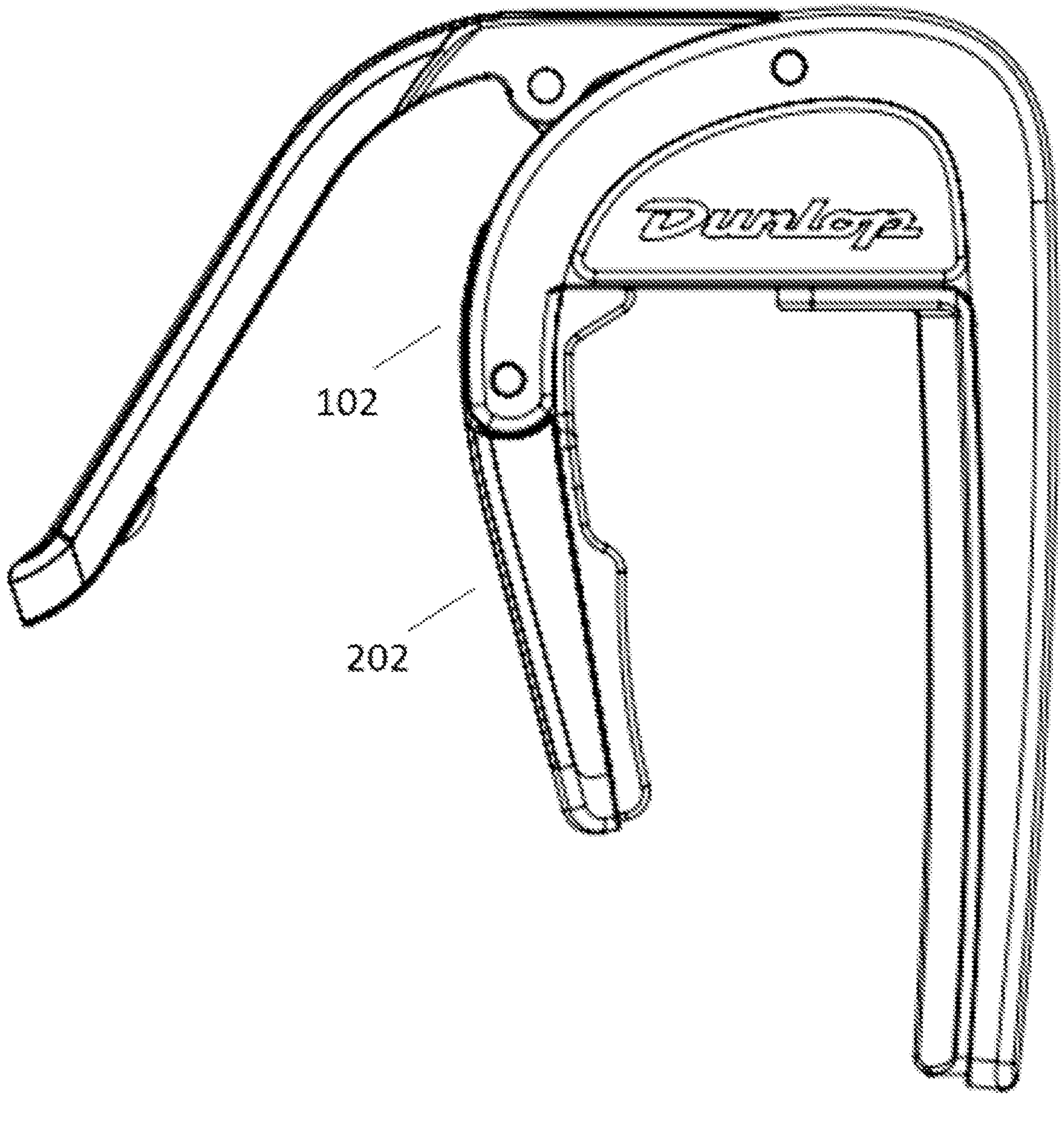
FIG. 8 depicts a side view of another embodiment of the present device.

FIG. 8 depicts a side view of another embodiment of the present device. In such embodiments, a single pivot arm 202 can be pivotally connected to a main body 102.

In operation, when the main arm 112 is actuated and rotated toward the pivot arm 104, the pivot arm pivots away from the main body 102 and when the main arm 112 is released and in a position away from the pivot arm 104, the pivot arm 104 is pivoted and biased by the spring 306 and linkage 320 toward the main body 102, thus allowing the main body 102 of the capo to be easily positioned along a fret board of a stringed instrument.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. A capo device for stringed instruments, comprising:

a substantially J-shaped main body having a distal elongate arm and a proximal short arm;

a pivot arm having a distal end and a proximal end, wherein distal end of said pivot arm is pivotally coupled substantially with the end of said proximal short arm of said J-shaped main body;

wherein said pivot arm further comprises a pivot clamp;

an elastomeric component pivotally and compressably coupled between a portion of said distal elongate arm of said J-shaped main body and the proximal end of said pivot arm; and a main arm pivotally coupled with said pivot arm and said main body;

wherein when said main arm is pivoted such that said main arm is in a first configuration relative to said pivot arm, said pivot arm is at a prescribed distance from said main body; and wherein when said main arm is pivoted such that said main arm is in a second configuration relative to said pivot arm, said pivot arm is biased via a spring toward a second position wherein said pivot arm is closer to said main body than said prescribed distance.

2. The capo device of claim 1, wherein said main arm is pivotally coupled with said pivot arm via a linkage, which is configured to selectively engage with a linkage seat on said pivot arm.

3. The capo device of claim 2, wherein said linkage further comprises a protrusion extending from a lateral edge, and wherein said protrusion selectively engages with said linkage seat.

4. The capo device of claim 2, further comprising a grip component on said main arm.

5. The capo device of claim 2, further comprising cushioning on an inner surface of said elongate arm and said pivot arm.

6. The capo device of claim 5 comprised of metal.

7. A capo device for stringed instruments, comprising:

a substantially J-shaped main body having a distal elongate arm and a proximal short arm;

a main arm having a proximal end and a distal end, wherein the distal end is pivotally connected to the proximal end of said proximal short arm;

a pivot arm having a proximal end and a distal end, wherein a point adjacent to said distal end is pivotally coupled at a point on the proximal end of said main arm via a linkage, which is configured to selectively engage with a linkage seat on said pivot arm;

a pivot clamp pivotally coupled to the proximal end of a pivot arm at a point substantially at the lateral center point of said pivot clamp;

an elastomeric component pivotally and compressably coupled between a portion of said elongate arm of said J-shaped main body and the proximal end of said pivot arm;

wherein when said main arm is pivoted such that said main arm is in a first configuration relative to said pivot arm, said pivot arm is at a prescribed distance from said main body; and wherein when said main arm is pivoted such that said main arm is in a second configuration relative to said pivot arm, said pivot arm is biased via said spring toward a second position wherein said pivot arm is closer to said main body than said prescribed distance.

8. The capo device of claim 7, wherein said linkage further comprises a protrusion extending from a lateral edge, and wherein said protrusion selectively engages with said linkage seat.

9. The capo device of claim 8 comprised of metal.

* * * * *